UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ALIPHATIC HYDROCARBONS WITH MORE THAN ONE DOUBLE BOND.

1,030,239. Specification of Letters Patent. Patented June 18, 1912.

No Drawing. Application filed February 3, 1910. Serial No. 541,762.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Processes of Producing Aliphatic Hydrocarbons with More Than One Double Bond, of which the following is a specification.

The preparation of aliphatic unsaturated hydrocarbons containing 2 double bonds, even of the lowest members of the series, meets with great difficulties. As to the higher members the synthesis of such double olefins has only been accomplished in a few cases, but none of the processes used has proved to be a practical method for the preparation of such compounds. Considering the value of these hydrocarbons for technical purposes, especially for the production of synthetic rubber, it was of the greatest importance to discover a way allowing of an easy production of the above mentioned hydrocarbons. The surprising discovery has now been made that *e. g.* by a complete methylation of tetramethylenediamin and beta-methyl-tetramethylenediamin and by decomposition of these quaternary ammonium bases, divinyl and isoprene respectively can be produced absolutely pure with a very good yield.

In order to illustrate the new process more fully the following examples are given, the parts being by weight:—

Example 1: A solution of 224 parts of potassium hydroxid in 500 parts of water is added to 88 parts of tetramethylenediamin. Then 855 parts of methyliodid are gradually introduced in small portions, the solution being cooled and the mixture is shaken until the combination with the tetramethylenediamin has taken place. The tetramethylene-hexamethyldiamin iodid thus formed of the formula:

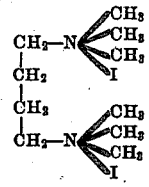

is then converted into the corresponding hydrate in the usual way *e. g.* by means of oxid of silver. The hydrate is a strongly basic almost colorless oil which hitherto could not be induced to crystallize. It decomposes easily under suitable conditions, *e. g.* even on warming, into water, trimethylamin and the product known in literature as divinyl which can be condensed by sufficient cooling and kept in pressure bombs.

Example 2: 200 parts of beta-methyl-tetra-methylenediamin, 450 parts of potassium hydroxid, 500 parts of water, 1000 parts of methyl-alcohol and 700 parts of methyl chlorid are heated in an autoclave for 12 hours to 100° C. The methyl alcohol is then removed by distillation and the product of the reaction is converted into the ammonium base in the manner already described. This base is also an oil which hitherto could not be induced to crystallize. On distillation it breaks up into water, trimethylamin and the known methyldivinyl (isoprene) of the boiling point 33–34° C.

Example 3: 204 parts of beta-methyl-tetra-methylenediamin, 1160 parts of a 28 per cent. caustic soda lye and 700 parts of methyl chlorid are heated in an autoclave for 6 hours to 70–80° C. The mass of the reaction is mixed with 600 parts of a 28 per cent. caustic soda lye and distilled.

The distillate is most advantageously collected in a separatory funnel. Two layers are observed, the upper one being a mixture of methyldivinyl containing a small quantity of trimethylamin in solution, while the lower layer consists of an aqueous solution of trimethylamin. The layer containing methyldivinyl is separated and treated with sulfuric acid to remove trimethylamin, dried with $CaCl_2$ and distilled. As type of the reactions which probably take place in the above described processes, the following equations for the steps described in example 3 are given:

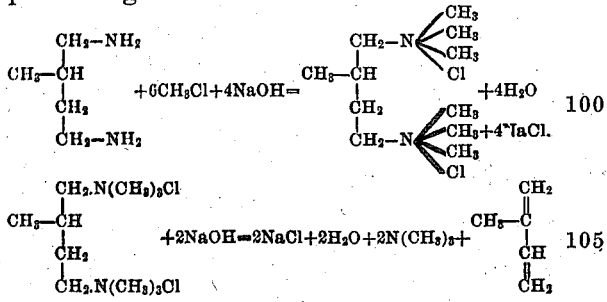

Instead of the polyvalent bases and instead of the alkyl-halogens mentioned in the examples other bases such as penta- and hexamethylenediamin and other halogen alkyls may be used.

We claim:—

1. Process of producing aliphatic hydrocarbons with more than one double bond which consists in completely alkylating saturated poly acid bases containing at least 4 carbon atoms, converting the products thus obtained into the quaternary ammonium bases and decomposing the quaternary ammonium bases, substantially as described.

2. Process of producing methyl-divinyl which process consists in completely alkylating beta-methyltetramethylenediamin with methyl halide, converting the tetramethylenehexamethyldiamin halide thus obtained into the corresponding quaternary ammonium base and subsequently decomposing the ammonium base into methyl-divinyl and trimethylamin, substantially as described.

3. Process of producing methyl-divinyl which process consists in completely alkylating beta-methyltetramethylenediamin with methyl iodid, converting the tetramethylenehexamethyldiamin iodid thus obtained into the corresponding quaternary ammonium base and subsequently decomposing the ammonium base into methyl-divinyl and trimethylamin, substantially as described.

In testimony whereof we have hereunto set our hands in the presence of two subscribing witnesses.

FRITZ HOFMANN. [L. S.]
CARL COUTELLE. [L. S.]

Witnesses:
OTTO KÖNIG,
CHAS. J. WRIGHT.